(12) United States Patent
Jolley et al.

(10) Patent No.: US 7,788,340 B2
(45) Date of Patent: Aug. 31, 2010

(54) SYSTEM AND METHOD FOR EVENT BASED INTERPORTLET COMMUNICATIONS

(75) Inventors: Christopher Jolley, Lone Tree, CO (US); Subrahmanyam Allamaraju, Longmont, CO (US); James D'Ambrosia, Westminster, CO (US)

(73) Assignee: BEA Systems Inc., Redwood Shores, CA (US)

(*) Notice: Subject to any disclaimer, the term of this patent is extended or adjusted under 35 U.S.C. 154(b) by 613 days.

(21) Appl. No.: 11/280,657

(22) Filed: Nov. 16, 2005

(65) Prior Publication Data

US 2006/0174093 A1 Aug. 3, 2006

Related U.S. Application Data

(60) Provisional application No. 60/630,124, filed on Nov. 22, 2004.

(51) Int. Cl.
G06F 15/16 (2006.01)
(52) U.S. Cl. .................. 709/219; 709/217; 709/203; 709/205; 709/220; 709/224
(58) Field of Classification Search ............. 709/219, 709/217, 203, 205, 220, 224
See application file for complete search history.

(56) References Cited

U.S. PATENT DOCUMENTS

| 6,192,382 | B1 | 2/2001 | Lafer et al. |
| 6,314,456 | B1 | 11/2001 | Van Andel et al. |
| 6,505,242 | B2 | 1/2003 | Holland et al. |
| 6,760,047 | B2 | 7/2004 | Hough et al. |
| 6,763,353 | B2 * | 7/2004 | Li et al. ............. 707/4 |
| 7,451,194 | B2 | 9/2004 | Bowser et al. |
| 6,832,263 | B2 | 12/2004 | Polizzi et al. |
| 6,871,197 | B1 | 3/2005 | Johnson |
| 6,918,090 | B2 | 7/2005 | Hesmer et al. |
| 6,973,619 | B1 | 12/2005 | Hirose et al. |
| 6,985,939 | B2 | 1/2006 | Fletcher et al. |

(Continued)

FOREIGN PATENT DOCUMENTS

JP 2003036197 2/2003

OTHER PUBLICATIONS

Schaeck, T., Web Services for Remote Portals (WSRP), Sep. 22, 2002, 18 pages.

(Continued)

*Primary Examiner*—Thu Nguyen
*Assistant Examiner*—Lan-Dai T Truong
(74) *Attorney, Agent, or Firm*—Fliesler Meyer LLP

(57) ABSTRACT

In accordance with embodiments, there are provided mechanisms and methods for configuring and executing portlet responses to events within a web portal framework. These mechanisms and methods can enable event descriptions to be organized within a portlet configuration file with event handlers designated for responding to the event. As used herein, the term event handler refers to description in a configuration file for a portlet that includes an event identifier, an event description, and a response to the event. The term can also refer to the functionality that is generated from the configuration information. The ability of embodiments to organize enable event descriptions within a portlet configuration file with event handlers designated for responding to the event can enable the portlet to respond as indicated by the configuration when an event is detected.

26 Claims, 8 Drawing Sheets

U.S. PATENT DOCUMENTS

| | | | |
|---|---|---|---|
| 6,988,135 B2 | 1/2006 | Martin et al. | |
| 7,000,008 B2 | 2/2006 | Bautista-Lloyd et al. | |
| 7,035,944 B2 | 4/2006 | Fletcher et al. | |
| 7,146,563 B2 | 12/2006 | Hesmer et al. | |
| 7,240,280 B2 | 7/2007 | Jolley et al. | |
| 7,254,542 B2 | 8/2007 | Dames et al. | |
| 7,266,600 B2 | 9/2007 | Fletcher et al. | |
| 7,313,601 B2 | 12/2007 | Fischer et al. | |
| 7,343,428 B2 | 3/2008 | Fletcher et al. | |
| 7,346,923 B2 * | 3/2008 | Atkins et al. | 726/6 |
| 7,373,422 B1 | 5/2008 | Paul et al. | |
| 7,376,739 B2 | 5/2008 | Ramaswamy et al. | |
| 7,444,633 B2 | 10/2008 | Bohn et al. | |
| 7,492,946 B2 | 2/2009 | Elder et al. | |
| 7,496,953 B2 | 2/2009 | Andreev et al. | |
| 2001/0009016 A1 | 7/2001 | Hofmann et al. | |
| 2002/0052954 A1* | 5/2002 | Polizzi et al. | 709/225 |
| 2002/0055956 A1 | 5/2002 | Krasnoiarov et al. | |
| 2002/0091732 A1 | 7/2002 | Pedro | |
| 2002/0111922 A1 | 8/2002 | Young et al. | |
| 2002/0111992 A1 | 8/2002 | Copeland et al. | |
| 2002/0116362 A1* | 8/2002 | Li et al. | 707/1 |
| 2002/0129354 A1* | 9/2002 | Bryan et al. | 717/176 |
| 2002/0169852 A1 | 11/2002 | Schaeck | |
| 2002/0194388 A1 | 12/2002 | Boloker et al. | |
| 2003/0050969 A1 | 3/2003 | Sant et al. | |
| 2003/0101412 A1 | 5/2003 | Eid | |
| 2003/0149722 A1 | 8/2003 | Jolley et al. | |
| 2003/0163513 A1 | 8/2003 | Schaeck | |
| 2003/0167315 A1 | 9/2003 | Chowdhry et al. | |
| 2003/0191669 A1* | 10/2003 | Fitzgerald et al. | 705/2 |
| 2004/0010755 A1 | 1/2004 | Hamada | |
| 2004/0030795 A1* | 2/2004 | Hesmer et al. | 709/231 |
| 2004/0034626 A1 | 2/2004 | Fillingham et al. | |
| 2004/0183831 A1 | 9/2004 | Ritchy et al. | |
| 2004/0205533 A1 | 10/2004 | Lopata et al. | |
| 2004/0225995 A1 | 11/2004 | Marvin et al. | |
| 2004/0230901 A1 | 11/2004 | Godwin et al. | |
| 2004/0261032 A1 | 12/2004 | Olander et al. | |
| 2005/0005243 A1 | 1/2005 | Olander et al. | |
| 2005/0028105 A1 | 2/2005 | Musson et al. | |
| 2005/0050065 A1 | 3/2005 | Wilson et al. | |
| 2005/0060721 A1* | 3/2005 | Choudhary et al. | 719/318 |
| 2005/0065797 A1* | 3/2005 | Haenel | 704/270.1 |
| 2005/0074098 A1* | 4/2005 | O'Brien et al. | 379/88.12 |
| 2005/0108034 A1 | 5/2005 | Musson et al. | |
| 2005/0108258 A1 | 5/2005 | Olander et al. | |
| 2005/0108647 A1 | 5/2005 | Musson et al. | |
| 2005/0108648 A1 | 5/2005 | Olander et al. | |
| 2005/0108699 A1 | 5/2005 | Olander et al. | |
| 2005/0108732 A1 | 5/2005 | Musson et al. | |
| 2005/0132072 A1 | 6/2005 | Pennell et al. | |
| 2005/0144269 A1 | 6/2005 | Banatwala et al. | |
| 2005/0177815 A1* | 8/2005 | Kurz et al. | 717/104 |
| 2005/0187978 A1 | 8/2005 | Qian et al. | |
| 2006/0005163 A1 | 1/2006 | Huesken et al. | |
| 2006/0010390 A1* | 1/2006 | Guido et al. | 715/742 |
| 2006/0036954 A1* | 2/2006 | Satyadas et al. | 715/742 |
| 2006/0070002 A1* | 3/2006 | Guido et al. | 715/733 |
| 2006/0080612 A1* | 4/2006 | Hayes et al. | 715/742 |
| 2006/0085500 A1 | 4/2006 | Allamaraju et al. | |
| 2007/0250780 A1* | 10/2007 | Choudhary et al. | 715/742 |
| 2008/0091985 A1* | 4/2008 | Haynes et al. | 714/57 |
| 2008/0140774 A1* | 6/2008 | Johnson | 709/203 |

OTHER PUBLICATIONS

Agrawal, R., A Service-Oriented Architecture for Rapid Development of Web Applications, 2001, ACM, pp. 355-365.

Murray, "An Investigation of Specifications for Migrating to a Web Portal Framework for the Dissemination of Health Information Within a Public Health Network," Proceedings of the 35th Hawaii International Conference on System Sciences, 2002, IEEE Computer Society, 9 pages.

Bea System Inc., BEA WebLogic Portal 4.0 Getting Started with Portals and Portlets, Oct. 28, 2002, BEA Systems Inc. Version 4.0, pp. 0-240.

* cited by examiner

SYSTEM AND METHOD FOR EVENT BASED INTERPORTLET COMMUNICATIONS

CLAIM OF PRIORITY

The present application claims the benefit of:
U.S. Provisional Patent Application No. 60/630,124, entitled SYSTEMS AND METHODS FOR IMPLEMENTING INTER-PORTLET COMMUNICATIONS, by Subrahmanyam Allamaraju, filed Nov. 22, 2004, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 11/280,657 entitled SYSTEM AND METHOD FOR EVENT BASED INTERPORTLET COMMUNICATIONS, by Christopher Jolley, et al., filed on Nov. 16, 2005;

U.S. patent application Ser. No. 11/280,659 entitled SYSTEM AND METHOD FOR IMPROVED INTERPORTLET COMMUNICATIONS, by Christopher Jolley, et al., filed on Nov. 16, 2005;

U.S. patent application Ser. No. 11/281,183 entitled IMPROVED USER INTERFACE FOR CONFIGURING WEB SERVICES FOR REMOTE PORTLETS, by Subrahmanyam Allamaraju, et al., filed on Nov. 16, 2005; and U.S. patent application Ser. No. 11/280,658 entitled SYSTEM AND METHOD FOR IMPROVED REMOTE PORTLET COMMUNICATIONS, by Subrahmanyam Allamaraju, et al., filed on Nov. 16, 2005.

FIELD OF THE INVENTION

The present invention relates generally to the design and implementation of web content. More specifically, it relates to communications between portlets in a web portal environment.

BACKGROUND

Web portals are web applications that provide a way to aggregate content and integrate applications, allowing a visitor to a Web site to access the content and applications via a user interface. These portals have become increasingly popular over the past several years as a mechanism for providing access to information and delivering content.

Many of these web portals include one or more pages that employ portlets, which are applications that are rendered and presented on pages within the portal, to provide functionality and access to data. These applications have become a preferred method for delivering information. As web portals have become more complex, several management issues have arisen. Individual portlets can often be affected by the behavior of the larger portal framework or other portlets. However, there is no robust mechanism for notifying portlets of events occurring within the larger portal framework, which often results in poor presentation and scalability difficulties. What is needed is an improved mechanism for inter-portlet communication in a web portal environment.

DETAILED DESCRIPTION

Figure 1:
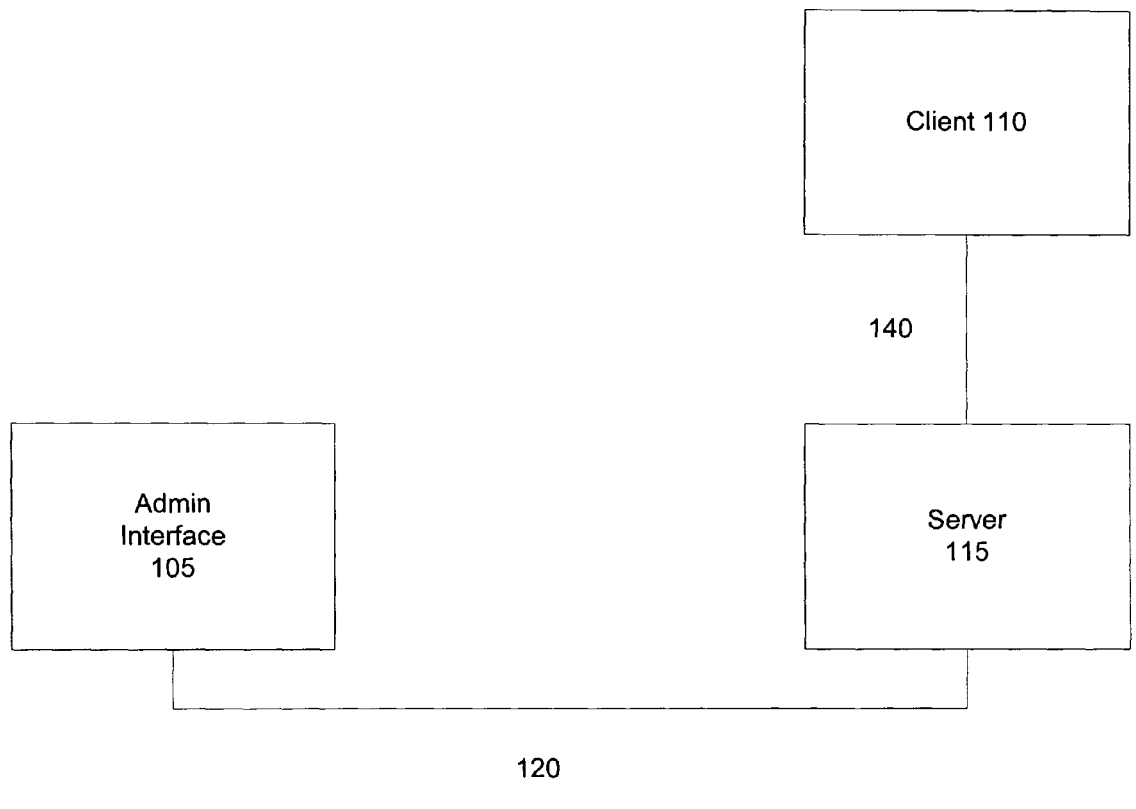
FIG. 1 illustrates one embodiment of the interaction between a portal administration system, a server and a client.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for configuring and executing portlet responses to events within a web portal framework. These mechanisms and methods can enable event descriptions to be organized within a portlet configuration file with event handlers designated for responding to the event. As used herein, the term event handler refers to description in a configuration file for a portlet that includes an event identifier, an event description, and a response to the event. The term can also refer to the functionality that is generated from the configuration information. The ability of embodiments to organize enable event descriptions within a portlet configuration file with event handlers designated for responding to the event can enable the portlet to respond as indicated by the configuration when an event is detected.

In an embodiment and by way of example, a method for configuring a portlet for detecting events is provided. The example method embodiment includes generating within a configuration of the portlet, a handler for an event, the event indicating a change in a web portal environment. As used herein, the term web portal environment refers to another portlet or a back end process, such as legacy software, database(s), content management system(s) and enterprise business service(s). The handler includes an identifier of the event and a description of the event. A response is also generated within the handler for the event, the response indicating an action to be taken by the portlet in response to the event.

While the present invention is described with reference to an embodiment in which techniques for configuring and executing portlet responses to events within a web portal framework are implemented using executable programs written in the Java™ programming language, the present invention is not limited to the Java™ programming language. (Java™ is a trademark of Sun Microsystems, Inc.) Embodiments may be practiced using other interconnectivity specifications or programming languages, i.e., JSP and the like without departing from the scope of the embodiments claimed.

FIG. 1 illustrates one embodiment of a system 100 for portal creation and user access. The system includes an administrative and design interface 105 and a server 115 connected through a network 120. The network 120 can include but is not limited to: public and/or private networks, wireless networks, optical networks, and satellite based communication links. Other means for providing communications between components of system 100 may be implemented by some embodiments and can include without limitation: random access memory, file system(s), distributed objects, persistent storage, and inter-processor communication networks. The server 115 is a server that supports a web portal and various applications that may be written using the Java™ programming language or other programming languages suitable for realizing web portals. (Java™ is a trademark of Sun Microsystems, Inc.) The administrative interface 105 is an interface that can be remote or local to the server 115 that is used to configure, modify, and extend the server 115. The server 115 may include one or more databases (not shown by FIG. 1 for brevity) that reside internally or are stored on an external, connected system.

A client system 110 interacts with the server 115 through a network 140, which may be similar to the network 120 or alternatively different from network 120 in topology and/or protocol. The client system can be a thin client, i.e., a computer having minimal functionality suited for one or more specific applications, or a fully functioning system with its own processing and storage capacity. A user of the client system 110 accesses the server 115. The client 110 is used to view web content and access web applications that are provided by the server 115.

Figure 2:
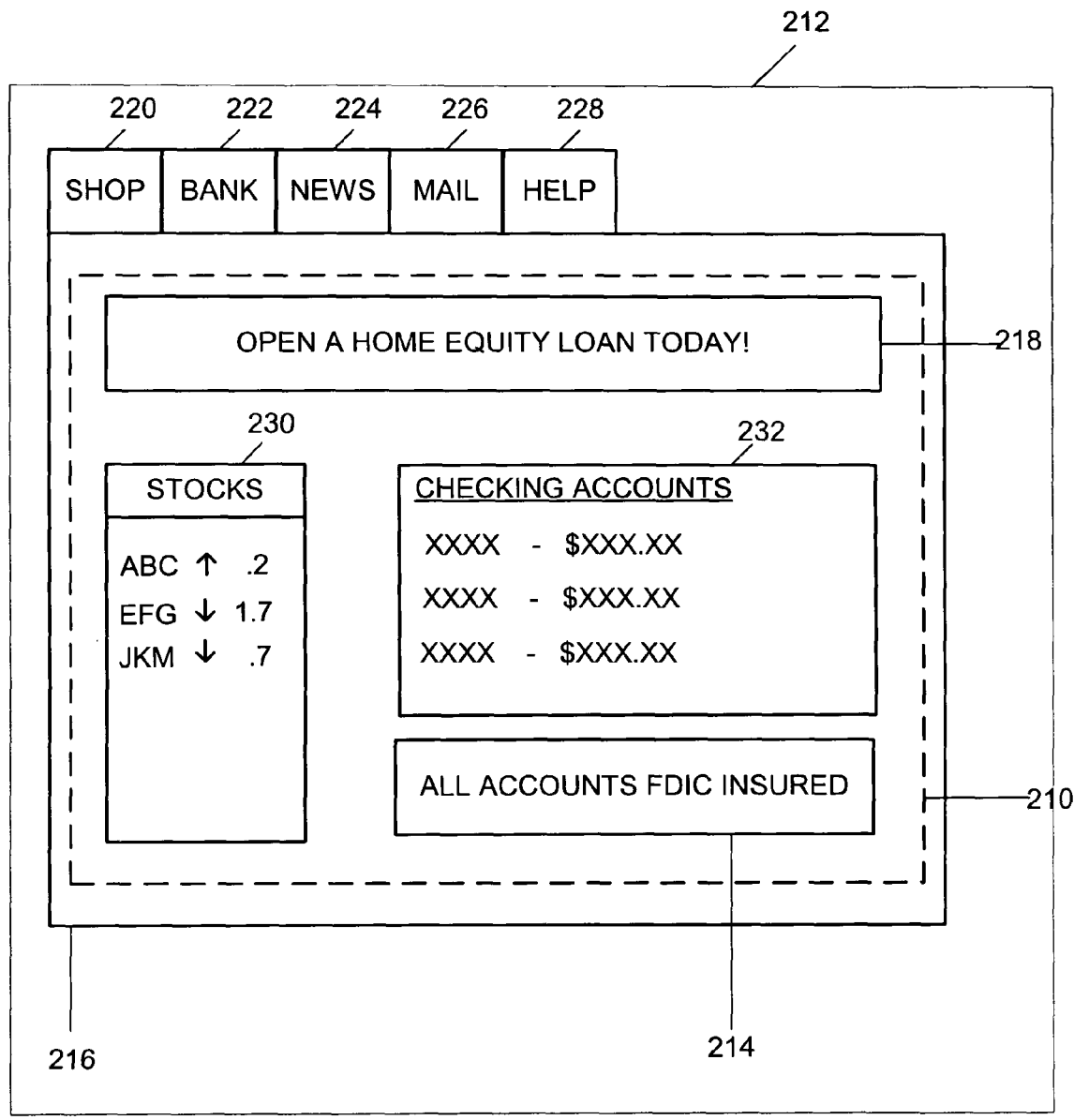
FIG. 2 illustrates a page within a portal environment in an embodiment.

FIG. 2 is an illustration of an exemplary web graphical user interface in an embodiment. A user of the client 110 can view this interface by accessing the server 115. In one embodiment, by way of example, a page 216 is rendered upon a display area 212, which can be a region in the display area of a device for displaying images and/or producing sounds (e.g., a computer monitor). The page 216 is comprised of several elements. Page selection tabs 220-228 can each be selected by a user to render a different page. Pages can be thought of as panels or panes that can be swapped into and out of a display region of the available portal display area. By way of a non-limiting example, selection of a user interface (UI) element can be accomplished with an input device such as a mouse, a motion detector, voice commands, hand or eye gestures, etc. Typical user interfaces that may be used by embodiments include Graphical user interfaces (GUI), tactile based interfaces, speech based interfaces and so forth. The present embodiment is illustrated with reference to a GUI type interface. If the tab 220 were selected, for example, the page corresponding to that tab could be rendered. Although the tabs 220-228 in FIG. 2 are displayed horizontally, in another embodiment the tabs could be displayed vertically or using some other suitable scheme such as a hierarchical menu.

Within the page 216 is a display area 210, which includes portlets (218, 230, 232) and other elements. A portlet application manages its own UI. Portlets can communicate with each other and with other software and hardware components (e.g., Enterprise Java Beans™, Java™ Beans, servlets, applets, etc.). The Java™ programming language, its libraries, environment, and toolkits are available from Sun Microsystems, Inc. of Santa Clara, Calif. The other software and hardware components may be part of the same execution environment as the portlet or may be in a different execution environment. In one embodiment, a portlet can be implemented with JavaServer Pages™. While portlets may be created based upon virtually any subject or topic, by way of a non-limiting example, the portlet 230 displays real-time stock ticker information. A user could configure such a portlet to display certain stocks, for example. In another embodiment, the user can select a given stock displayed in the portlet 230 and receive more detailed information, such as the price history, price to earnings ratio, etc.

The portlet 230 can handle user input and responding accordingly. The portlet 232 displays up-to-date information pertaining to a user's checking accounts. Likewise, the portlet 232 could provide detailed information on transactions if the user were to select an account. An advertisement portlet 218 displays an advertisement that could be directed specifically to the current user based on demographics or other information. For instance, if a user had an outstanding home loan in good standing, the advertisement could be for a home equity loan. Likewise, if the user had an appropriate amount in a savings account, the advertisement could be for a new car loan. A static area 214 contains text or an image with text.

Figure 3:
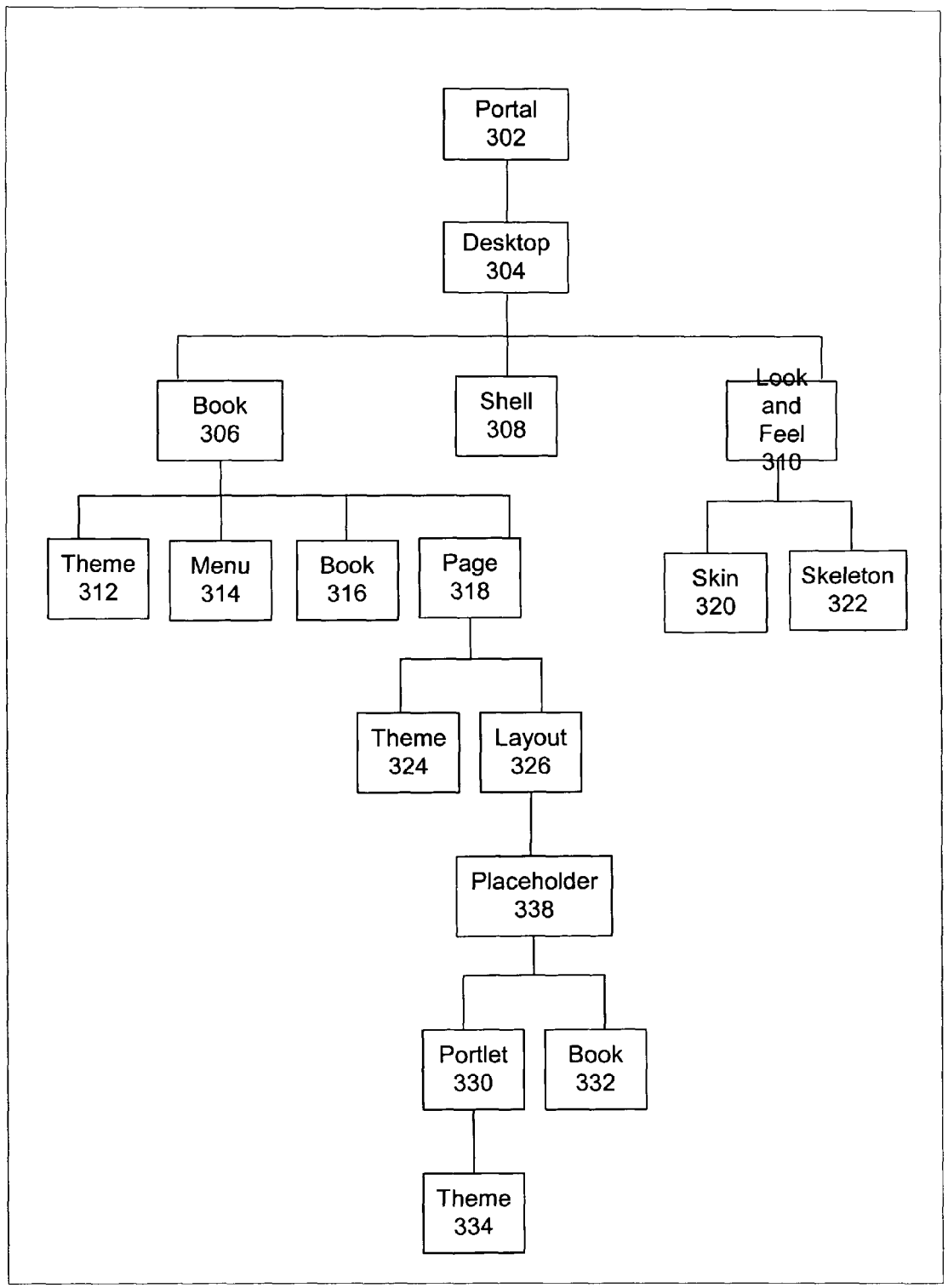
FIG. 3 illustrates an organization of a portal in an embodiment.

FIG. 3 is an illustration of a structure of a portal. In one embodiment, the portal is a web application running on the server 115. The taxonomy illustrated herein can be presented as a control tree generated from a portal file. In one embodiment, each node in the control tree can be a subclass of a Control class in an object-oriented paradigm. A control tree can be created with both statically created controls and dynamically created controls. Statically created controls are created during a construction (or "wire-up") phase of the control tree and, in one embodiment, can be based on static markup. Dynamically created controls are created during a control tree lifecycle, many times in reaction to state, context, and events.

One embodiment provides a set of controls that represent corresponding graphical and functional elements in web applications. Controls can have properties that can be read and set, and controls can interact with each other through an event notification mechanism. In addition to properties and events, controls can also have methods which provide services and which may be overridden to provide specialization of the control. In one embodiment, a control can be implemented as one or more classes in an object-oriented programming paradigm. Such an arrangement allows for new properties, events and/or specialized control methods to be provided by extending base control classes related to these features. In a framework, controls can also serve as containers for other controls. By way of a non-limiting example, a page may contain a book and a portlet, the book may contain one or more pages, the portlet may contain a window, the window may contain a title bar which may contain a close button, etc.

In various embodiments, the structure can contain one or more controls 302 representing one or more portals. From an end-user perspective, a portal is a website whose pages can be navigated. From an enterprise perspective, a portal is a container of resources and functionality that can be made available to end-users. Portals can provide a point of access to applications and information and may be one of many hosted within a web/application server. In one embodiment, a portal can be a J2EE application consisting of EJB (Enterprise Java Bean) components and a set of Web applications. In another embodiment, a portal can be defined by an XML (eXtensible Markup Language) file. The portal file can contain all of the components that make up that particular instance, such as books, pages, portlets, and look and feel components.

A GUI can contain one or more desktop controls 304. A desktop control in turn can contain one or more personalized views or user views (not shown). A user can have one or more personalized user views of a desktop. In one embodiment, a user view can result from customizing the layout, content, number, and appearance of elements within a desktop. A default user view can be provided for users who have not yet customized a desktop. A desktop's appearance can be determined by a Look and Feel control 310. The look and feel control can contain a skin component 320 and a skeleton component 322. Skins can provide the overall colors, graphics, and styles used by all components in a desktop interface. In one embodiment, skins can include collections of graphics and cascading style sheets (CSS) that allow changes to be made to the look and feel of the GUI without modifying other components directly. References to images and styles can be made in the skin rather than being hard-coded into a GUI definition. A look and feel component can provide a path to a skin directory to be used.

The look and feel file can also provide a path to the skeleton directory to be used. Every type of component, from a desktop to a portlet's title bar, can have an associated JSP (Java ServerPages™) file, called a skeleton file, which renders it. For example, each desktop uses a skeleton file called shell.jsp that simply provides the opening and closing <HTML> (Hypertext Markup Language) tags to render the desktop. A portlet title bar, on the other hand, can have a skeleton file called titlebar.jsp that is more complex. It contains Java calls to various windowing methods in the API, references the button graphics to use on the title bar, and determines the placement of title bar elements with an HTML table definition.

A desktop also can contain a book control 306. A book control represents a set of pages linked by a page navigator (menu 314) having a user selectable graphical representation (e.g., a series of tabs wherein each tab corresponds to a different page, a series of buttons, a menu, or other suitable means.) A book can provide an indication of the currently selected page through visual clues such as highlighting a currently selected tab, displaying text and/or graphics to indicate the current page, etc. Books can be nested to n levels. A book can optionally include a theme control 312. In one embodiment, a theme control represents a subset of a skin component and can provide a way of using a different set of styles for individual desktop components. The book control can also contain other books 316.

A shell control 308 can render anything surrounding the book 306 in the desktop 304. For example, a shell control might render a desktop's header and footer. These areas usually display such things as personalized content, banner graphics, legal notices, and related links.

A book also contains zero or more page controls 318. A page control can represent a web page in an embodiment. A page is an area of a GUI upon which other elements having GUIs, such as books and portlets, can be placed. Pages can also contain books and other pages, and can be identified/navigated to by a control such as a menu 314. A page control can also hold a theme control 324 and a layout control 326. A layout control determines the physical locations of portlets and other elements on a page. In one embodiment, a layout is can be implemented as an HTML table.

A layout can contain a placeholder control 328 that is comprised of individual cells in a layout in which portlets are placed. A placeholder can contain zero or more books 332 and zero or more portlets 330 such as the portlets 218, 230, 232 illustrated with respect to FIG. 2. Portlets can communicate with other portlets and with back-end processes such as legacy software, databases, content management systems, enterprise business services, etc. A portlet can also contain a theme 334.

A control tree can represent a particular instance of the control taxonomy. In one embodiment, each node in the control tree can be a subclass of a Control class in an object-oriented paradigm. A control tree can be created with both statically created controls and dynamically created controls. Statically created controls are created during a construction (or "wire-up") phase of the control tree and, in one embodiment, can be based on static markup. Dynamically created controls are created during a control tree lifecycle, many times in reaction to state, context, and events. Both kinds of controls can create content either dynamically (e.g., by binding to a database table) or statically (e.g., by containing a literal string).

Figure 4:
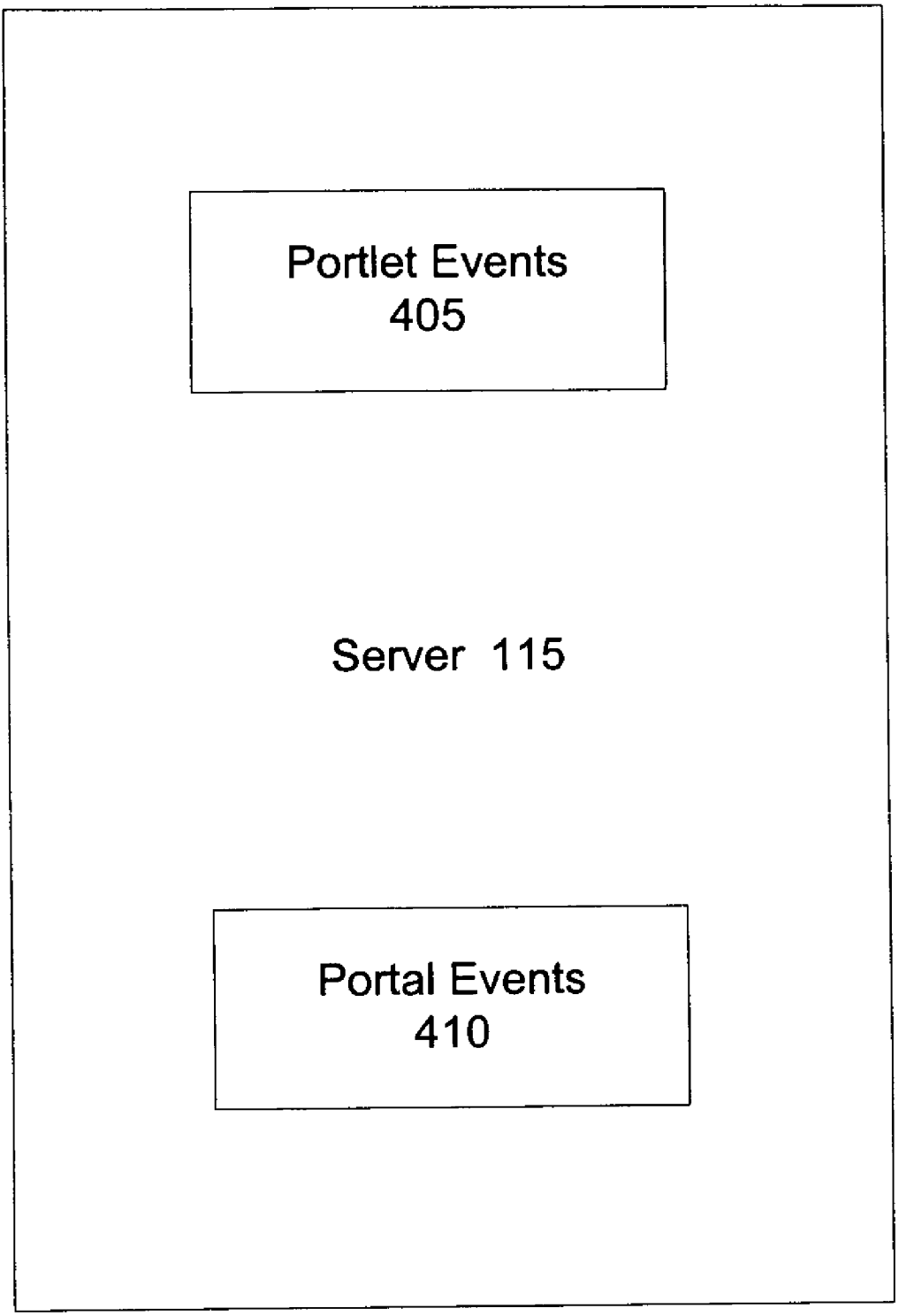
FIG. 4 illustrates a closer view of configuration files in an embodiment.

FIG. 4 illustrates a closer view of configuration files in an embodiment. The configuration files are stored in the server 115 or a database associated with the server. The configuration files include portlet specific event files 405 and global portal event files 410. The portlet specific event files 405 provide event configuration information for specific portlets on a per-portlet basis. This information includes a designated event handler for particular types of events. Additionally, the portlet specific event files 405 can include configured responses that are performed in response to notification of an event. The portlet specific event files can also include filters for processing events transmitted from other portlets. In some embodiments, the portlet specific configuration files are part of general portlet configuration files containing information for deploying portlets. In some embodiments, the portlet specific configuration files are stored within a deployment file for a portlet. A deployment file can be an XML document containing instructions that are used to generate a portlet during deployment.

The global portal event files 410 include event management instructions that are utilized for all portlets. In some embodiments, the portlet specific files will also include priority information for managing conflicts between the global 410 and portlet-specific 405 files. When a portlet is deployed, the global event files can be utilized for the deployment.

Figure 5:
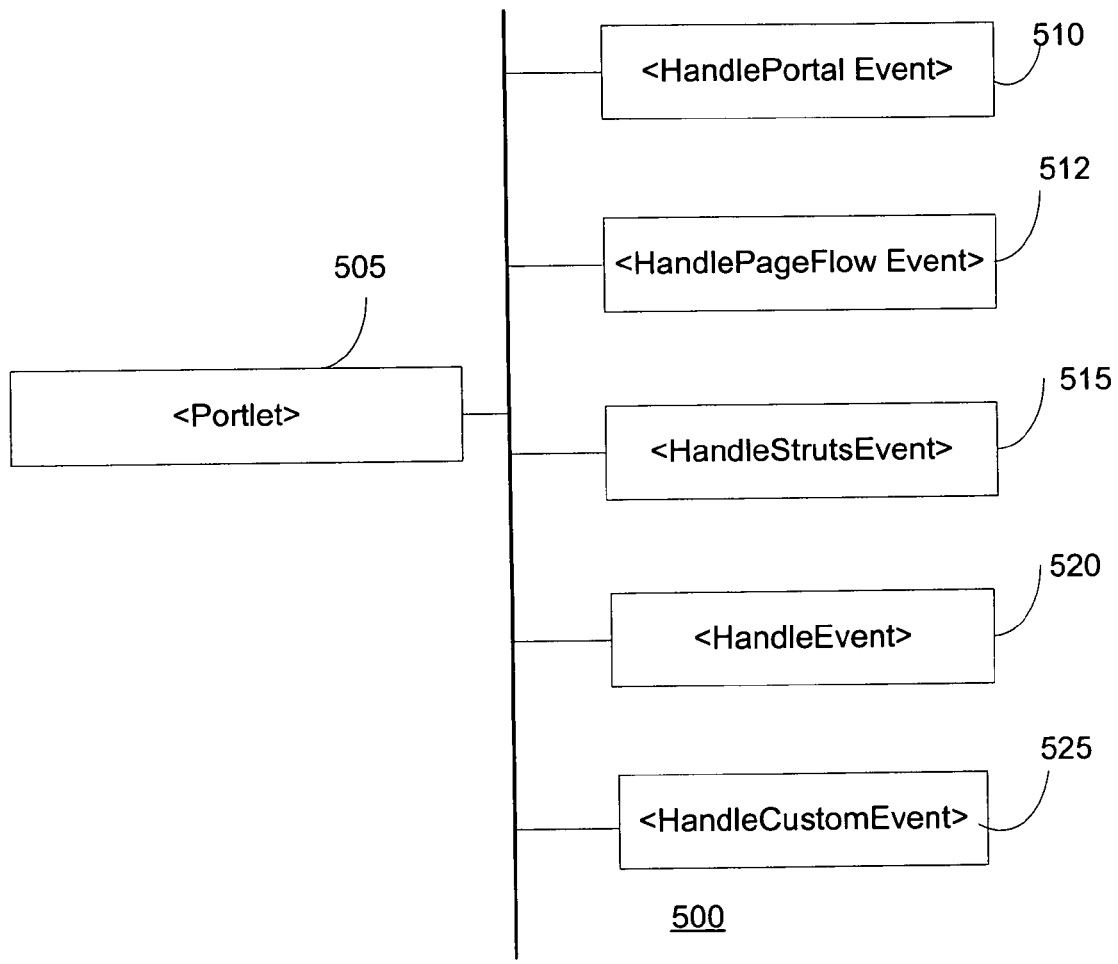
FIG. 5 illustrates an organization of configuration information for defining events in an embodiment.

FIG. 5 illustrates a configuration for defining events in an embodiment. In one embodiment, this structure is part of an XML document containing instructions for generating a portlet. During a deployment phase, a deployment tool parses the XML document, including the sections pertaining to event handling and generates the portlet. While in the present embodiment this configuration is organized as tags within an XML document, in alternate embodiments, other organizations can be used.

A parent <Portlet> tag 505 designates that all of the child tags describe characteristics of a portlet. The <Portlet> tag typically includes other child tags than those illustrated in FIG. 5, such as tags that define the functionality of the portlet. The child tags 510, 512, 515, 520, 525 define a set of handlers for events. During deployment, this configuration information is used to produce a portlet having the set response to the defined event. The handlers may interact with an event filtering configurator that indicates how the portlet responds to messages from events generated by other portlets or by other sections of the portal framework.

While in the present embodiment, only one of each tag is illustrated, in alternate embodiments multiple versions of each tag can be present. For example, there could be multiple <HandleCustomEvent> tags for multiple custom events.

The child tags 510, 515, 520, 522, 525 include the following common attributes that are disclosed in TABLE 1.

TABLE 1

| | |
|---|---|
| eventLabel | This is an identifier that can be used to distinguish multiple event handlers in the same portlet. |
| filterable | This tag enables the use of an event filtering configuration, which enables a portlet to listen to other portlets. |
| description | Provides a description of the event. |
| sourceDefinitionLabels | A list of portlet definitions specifying the definition labels of portlets a portlet can listen to. This configuration prevents portlets from being affected by unrelated portlets. |
| onlyIfDisplayed | This tag defines whether the handler only is invoked when the owning portlet instance is visible |
| fromSelfInstanceOnly | This tag can define whether the handler for a given portlet instance only is invoked when the source event originates from that instance. |

The child tags include a <HandlePortalEvent> tag 510. This tag defines a handler for events in the portal framework. This tag is designed to provide a response to common events that occur in the portal framework. A portlet can have any number of these tags. In addition to the general attributes described in TABLE 1, each <HandlerPortalEvent> tag 510 includes an event attribute. The event attribute indicates a characteristic of the triggering event. Below are sample events, though other events can be used:

onActivation—A window was previously hidden but is now visible.
onDeactivation—A window was previously visible but is now hidden.
onMinimize—A window wasn't in minimized state on the last request, but now is.
onMaximize—A window wasn't in maximized state but now is.
onNormal—A window was previously minimized or maximized but now is in normal state.
onDelete—A window wasn't deleted before but now is.
onHelp—A window wasn't in help mode but now is.
onEdit—A window wasn't in edit mode but now is.
onView—A window wasn't in view mode but now is.
onRefresh—Runs every time the portal is rendered with this window visible.

The <HandlePageFlowevent> 512 and <HandleStrutsevent> 515 tags are configured to define handlers for PageFlow events and Struts events. PageFlow events refer to events that are particular to PageFlow portlet. Struts events refer to events that are particular to Struts portlets. Each of these tags includes an action attribute that indicates the name of a Struts or Pageflow action that triggers the event response in the handler. The <HandleCustomEvent> tag 525 includes an attribute indicating a string identifying the custom event that produces the associated response. The <HandleCustomEvent> tag is used to define a handler for events that are not included in the definitions for the other tags.

The <HandleEvent> tag 520 defines a handler for a generic event. This handler includes an attribute value indicating a string identifying an action that produces the response. These events can an event of any of the types described in the other child tags or any custom events defined in a <HandleCustomEvent> tag.

Figure 6:
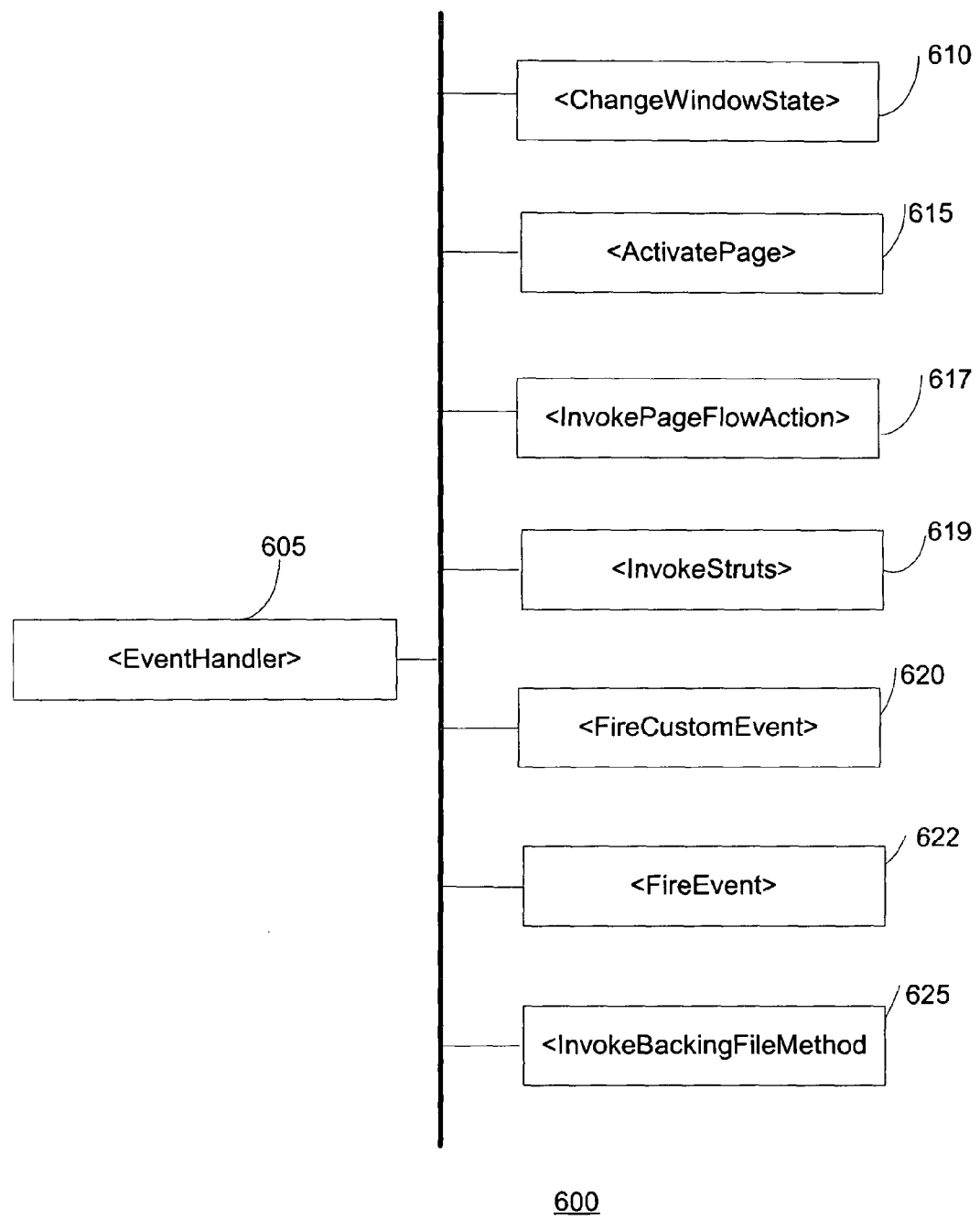
FIG. 6 illustrates an organization of configuration information for responding to events in an embodiment.

FIG. 6 illustrates an organization of configuration information for responding to events in an embodiment. The differing response tags 610-625 are children of an <EventHandler> 605 tag such as the event handler tags 510-525 described with respect to FIG. 5. While in the present embodiment, this configuration information is presented as tags in an XML document, in alternate embodiments the configuration information can be organized differently. While these responses are used as examples, in alternate embodiments other responses can be included. The inclusion of these tags as children to an event handler causes the responses associated with the tags to be performed when the event associated with the handler is detected. An <EventHandler> tag 605 can have any or all of these child tags as responses and can have multiple instances of a single type (e.g. multiple <fireEvent> tags indicating different events to be fired in response to an event).

The <ChangeWindowState> tag 610, when added causes a portlet to change to a new window state in response to the event. It includes an attribute indicating the value of the new window state. Examples of window states include a normal state, a maximized state, and a minimized state. The <ChangeWindowMode> tag 615, when added causes a portlet to change to a new window mode in response to the event. It includes an attribute indicating the value of the new window mode. Examples of window modes include an enabled state in which the window displays content from a specified Uniform Resource Indicator (URI) and disabled, in which it does not.

An <ActivatePage> tag 615, when inserted causes a page change event, to the page that the portlet instance resides in to occur in response to the event. The <InvokePageFlowAction> 617 tag causes the portlet to respond by invoking a page flow action. This tag can include a pageflow action to be invoked when the event is detected. The <InvokeStruts> tag 619, when stored in a handler, cause a struts action to be performed when the event is detected. This tag includes attributes indicating the struts action to be performed. The <FireCustomEvent> 620 and <FireEvent> 622 tags, when included, cause a custom or generic event to be to be transmitted to the portal framework as a whole when the event is detected. The use of these as responses enables cascading events to be performed as the respondent events can trigger other event handlers. These two tags 620, 622 have attribute values indicating the events to be fired to the portal framework. The invokeBackingFileMethod tag 625, when detected causes the portal framework to initiate a backing file method. The tag includes an attribute indicating a name of the method to call.

Figure 7:
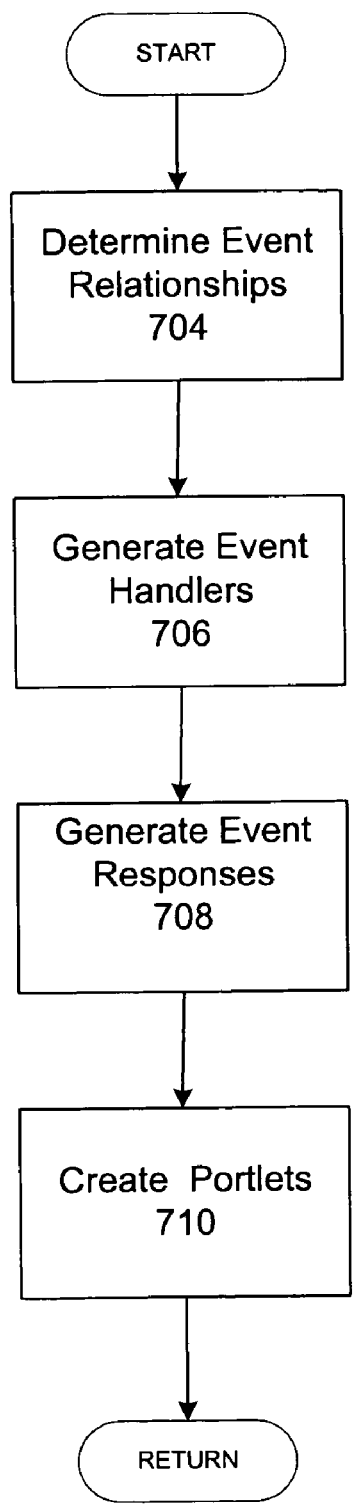
FIG. 7 is a flow chart for configuring portlet events in an embodiment.

FIG. 7 is a flow chart illustrating a process for configuring portlet events. In block (700), event relationships are determined. Determining event relationships entails determining what responses are performed in response to which events. For example, when presenting a group of pages in a book, an administrator might wish to cause a portlet on one of those pages to return to an initial state if a user navigates to another page in the book.

In block (702), event handlers are defined in the configuration file. The event handlers can include any of the event handlers described with respect to FIG. 5. The event handlers and the events that trigger them are determined according to which events are likely to be relevant to a state of a portlet. Depending on the types of portlets and the configuration of the web portal any of the event handlers in FIG. 5 can be used for a portlet. In some embodiments, this configuration information is stored in an XML document for generating the portlet.

In block (704) responses are generated for each of the event handlers defined in block (702). Each of the event handlers can have one or more responses that are performed when the specified events are detected. In block (706), the configuration information for the event handlers and responses are used to generate a portlet that is deployed by the server. The portlets can respond to events as per the configuration information.

Figure 8:
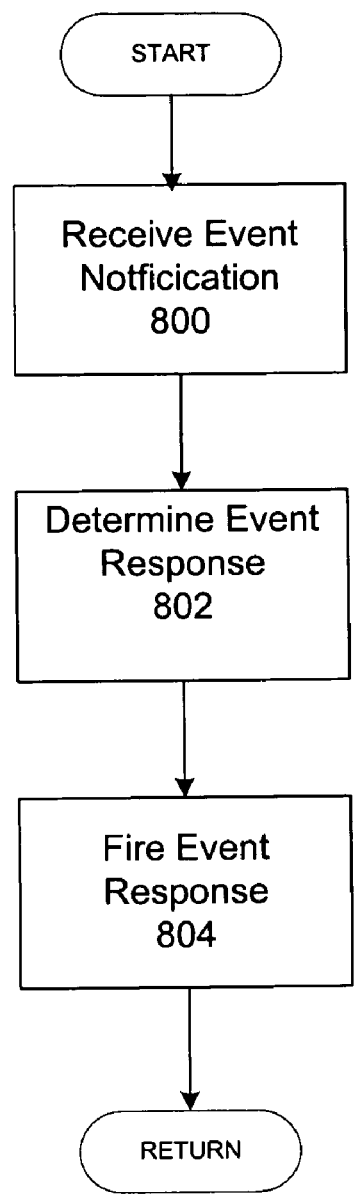
FIG. 8 is a flow chart for reacting to a portlet event in an embodiment.

FIG. 8 is a flow chart illustrating a process for reacting to a portlet event. In block (800) an event notification is received by the portlet. The event notification is typically transmitted from the portal framework and includes an identifier for the event and an origin for the event. The identifier can be an event name as described in FIG. 5 or some other form of identifier. The origin includes a source for the event. For example, the origin can be another portlet, the portlet itself, or the portal framework generally. Different systems may include varying limitations on when a portlet action can be raised. In some embodiments, a backing context is utilized to transmit an event to a portlet. A backing context is a class that is run from the portal framework to interact with a backing file for an element in the portal framework. The backing file is a class that is wired to elements in a portal from a central portal configuration. Backing files typically provide functional logic that is combined with presentation logic gained from JSPs. When an element is rendered, the backing file is used to retrieve and receive data from the portal architecture and can be used to receive events.

In block (802) the portlet determines the event response. The portlet, upon receiving the identifier is configured to respond as per the event response. In some embodiments, the portlet includes one or more filters indicating which events from other portlets can be ignored.

In block (804) the portlet fires the responses associated with the event. The responses can include initiating changes to the portlet state, sending different event notifications back to the portlet framework, closing the portlet, initiating page-flow actions, or any other type of response. In some embodiments, portlet events can cascade, with a first event triggering an event notification for a second event, which triggers an event notification for a third event.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs).

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed is:

1. A method for configuring a plurality of portlets for detecting events, the method comprising:
   parsing a configuration file stored on a computer readable storage medium by a server, wherein the configuration file defines portlet specific event files, global portal event files, a filter and a handler for each event;
   whereupon parsing the configuration file, the server
      employs the portlet specific event files to associate a portlet specific response with an event for each of the plurality of portlets by specifying the handler for the event,
      employs the global portal event files to include event management instructions utilized by each of the plurality of portlets,
      wherein the configuration file includes priority information for managing conflicts between the global portal event files and the portlet specific event files,
      generates the handler for the event, the event indicating a change in a web portal environment, wherein the handler includes an event identifier of the event, and creates the filter, the filter indicating whether one of the plurality of portlets on the server responds to the event;

detecting a performance of the event;

filtering the event as defined in the filter, wherein each filtered event triggers a notification;

transmitting to one of the plurality of portlets the notification for each filtered event, the notification including a notification identifier corresponding to the filtered event;

detecting a conflict between the portlet specific event files and the global portal event files, and using the priority information to resolve the conflict;

matching the notification identifier with the event identifier, wherein the one of the plurality of portlets is configured to perform the portlet specific response to the filtered event upon matching the identifiers, the portlet specific response indicating an action to be taken by the portlet in response to the event; and wherein performing the portlet specific response to the filtered event by the one of the plurality of portlets triggers a second event for a second portlet such that the second portlet performs the response associated with the second event.

2. The method of claim 1, wherein:

the event indicates a change in at least one of another portlet of the plurality of portlets and a back-end process.

3. The method of claim 2, wherein the event indicating a change in the at least one of another portlet of the plurality of portlets or a back-end process comprises:

at least one of legacy software, database(s), content management system(s) and enterprise business service(s).

4. The method of claim 1, wherein for a portlet of the plurality of portlets, the configuration of the portlet comprises:

an eXtensible Markup Language (XML) document associated with the portlet.

5. The method of claim 4, wherein for a portlet of the plurality of portlets, the XML document associated with the portlet comprises:

a handler for an event that is a tag within the XML document indicating processing triggered responsive to occurrence of the event.

6. The method of claim 1, wherein for a portlet of the plurality of portlets, the configuration of the portlet comprises:

a portlet file associated with the portlet containing a handler for an event.

7. The method of claim 1, wherein for a portlet of the plurality of portlets, the response indicating an action to be taken by the portlet in response to the event comprises:

a set of instructions describing a set of actions to be taken by the portlet in response to the event.

8. The method of claim 1, wherein for a portlet of the plurality of portlets, the event comprises a change in mode of a window of the portlet.

9. The method of claim 1, wherein for a portlet of the plurality of portlets, the event comprises a change in status of a window of another portlet of the plurality of portlets in the web portal environment.

10. The method of claim 1, wherein for a portlet of the plurality of portlets, the response comprises a change in status of a window of the portlet.

11. The method of claim 1, wherein for a portlet of the plurality of portlets, the portlet comprises at least one of: a struts portlet, a Java portlet and a pageflow portlet.

12. The method of claim 1, wherein for a portlet of the plurality of portlets, the web portal environment currently presents a page in a plurality of pages, wherein a representation of the portlet resides on a page in the plurality of pages that is not currently presented by the web portal environment, and wherein the action to be taken by the portlet in response to the event causes the page on which the representation of the portlet resides to be currently presented by the web portal environment.

13. The method of claim 1, wherein for a portlet of the plurality of portlets, the response comprises triggering a handler for a second event within the portlet to cause a response associated with the second event, and further wherein the response associated with the second event comprises triggering a handler for a third event within the portlet to cause a response associated with the third event.

14. A machine readable storage medium having instructions stored thereon that when executed by a processor cause a system to:

parse a configuration file stored on a computer readable storage medium by a server, wherein the configuration file defines portlet specific event files, global portal event files, a filter and a handler for each event;

whereupon parsing the configuration file, the server employs the portlet specific event files to associate a portlet specific response with an event for each of the plurality of portlets by specifying the handler for the event, employs the global portal event files to include event management instructions utilized by each of the plurality of portlets, wherein the configuration file includes priority information for managing conflicts between the global portal event files and the portlet specific event files, generates the handler for the event, the event indicating a change in a web portal environment, wherein the handler includes an event identifier of the event, and creates the filter, the filter indicating whether one of the plurality of portlets on the server responds to the event;

detecting a performance of the event;

filter the event as defined in the filter, wherein each filtered event triggers a notification;

transmit to one of the plurality of portlets the notification for each filtered event, the notification including a notification identifier corresponding to the filtered event;

detect a conflict between the portlet specific event files and the global portal event files, and using the priority information to resolve the conflict;

match the notification identifier with the event identifier, wherein the one of the plurality of portlets is configured to perform the portlet specific response to the filtered event upon matching the identifiers, the portlet specific response indicating an action to be taken by the portlet in response to the event; and wherein performing the portlet specific response to the filtered event by the one of the plurality of portlets triggers a second event for a second portlet such that the second portlet performs the response associated with the second event.

15. The machine readable storage medium of claim 14, wherein:

the event indicates a change in at least one of another portlet of the plurality of portlets and a back-end process.

16. The machine readable storage medium of claim 15, wherein:

the at least one of another portlet of the plurality of portlets and a back-end process is at least one of legacy software, database(s), content management system(s) and enterprise business service(s).

17. The machine readable storage medium of claim 14, wherein:
the configuration of a portlet of the plurality of portlets is an eXtensible Markup Language (XML) document associated with the portlet.

18. The machine readable storage medium of claim 17, wherein:
the XML document includes a tag indicating processing triggered responsive to occurrence of the event.

19. The machine readable storage medium of claim 14, wherein:
the configuration of a portlet of the plurality of portlets is a .portlet file.

20. The machine readable storage medium of claim 14, wherein for a portlet of the plurality of portlets, the response indicating an action to be taken by the portlet in response to the event is:
a set of instructions describing a set of actions to be taken by the portlet in response to the event.

21. The machine readable storage medium of claim 14, wherein the event comprises an event relating to another portlet of the plurality of portlets in the web portal environment.

22. The machine readable storage medium of claim 14, wherein the event comprises a change in status of a window of another portlet of the plurality of portlets in the web portal environment.

23. The machine readable storage medium of claim 14, wherein for a portlet of the plurality of portlets, the response comprises a change in status of a window of the portlet.

24. The machine readable storage medium of claim 14, wherein for a portlet of the plurality of portlets, the portlet comprises at least one of: a struts portlet, a Java portlet and a pageflow portlet.

25. A system for configuring a plurality of portlets for detecting events in a web portal environment, the system comprising:
a server device including a configuration file that defines portlet specific event files, global portal event files, a filter and a handler for each event, and containing instructions for generating the portlet associated with the configuration; and
whereupon parsing the configuration file, the server device
employs the portlet specific event files to associate a portlet specific response with an event for each of the plurality of portlets by specifyin,q the handler for the event,
employs the global portal event files to include event management instructions utilized by each of the plurality of portlets,
wherein the configuration file includes priority information for managing conflicts between the global portal event files and the portlet specific event files,
generates the handler for the event, the event indicating a change in a web portal environment, wherein the handler includes an event identifier of the event, and
creates the filter, the filter indicating whether one of the plurality of portlets on the server device responds to the event;
detect a performance of the event;
filter the event as defined in the filter, wherein each filtered event triggers a notification;
transmit to one of the plurality of portlets the notification for each filtered event, the notification including a notification identifier corresponding to the filtered event;
detect a conflict between the portlet specific event files and the global portal event files, and using the priority information to resolve the conflict;
match the notification identifier with the event identifier, wherein the one of the plurality of portlets is configured to perform the portlet specific response to the filtered event upon matching the identifiers,-the portlet specific response indicating an action to be taken by the portlet in response to the event; and
wherein performing the portlet specific response to the filtered event by the one of the plurality of portlets triggers a second event for a second portlet such that the second portlet performs the response associated with the second event.

26. The method of claim 1, wherein a portlet of the plurality of portlets is a page flow portlet and wherein the action to be taken by the portlet is a page flow action.

* * * * *

UNITED STATES PATENT AND TRADEMARK OFFICE
CERTIFICATE OF CORRECTION

| | | |
|---|---|---|
| PATENT NO. | : 7,788,340 B2 | |
| APPLICATION NO. | : 11/280657 | |
| DATED | : August 31, 2010 | |
| INVENTOR(S) | : Christopher Jolley et al. | |

It is certified that error appears in the above-identified patent and that said Letters Patent is hereby corrected as shown below:

On the Title page

On page 2, Item (56), under "Other Publications", line 3, delete "Murray," and insert -- Murray, M., --, therefor.

On sheet 8 of 8, in Figure 8, Box. No. 800, line 2, delete "Notficication" and insert -- Notification --, therefor.

In column 14, line 7, in claim 25, delete "specifyin,q" and insert -- specifying --, therefor.

In column 14, line 33, in claim 25, delete "identifiers,-the" and insert -- identifiers, the --, therefor.

Signed and Sealed this
Twenty-sixth Day of July, 2011

David J. Kappos
*Director of the United States Patent and Trademark Office*